United States Patent [19]

Hovens et al.

[11] 3,714,454

[45] Jan. 30, 1973

[54] STABILIZED CAPACTIVE SAWTOOTH GENERATOR

[75] Inventors: Paulus Joseph Maria Hovens; Wouter Smeulers, both of Emmasingel, Netherlands

[73] Assignee: U.S. Philips Corporation, New York, N.Y.

[22] Filed: Nov. 23, 1970

[21] Appl. No.: 91,677

[30] Foreign Application Priority Data

Dec. 6, 1969 Netherlands ........................6918361

[52] U.S. Cl. ..................307/109, 307/260, 307/271, 320/1, 331/176

[51] Int. Cl..........H03k 1/04, H03k 1/16, H03k 4/56

[58] Field of Search.....340/173 CA; 320/1; 307/109, 307/260, 271; 331/176

[56] References Cited

UNITED STATES PATENTS 3,239,778 3/1966 Rywak..............................331/176 X
3,463,937 8/1969 Taylor.................................320/1 X
3,465,207 9/1969 Merdian..............................320/1 X
3,210,558 10/1965 Owen..................................320/1 X

*Primary Examiner*—Bernard Konick
*Assistant Examiner*—Stuart Hecker
*Attorney*—Frank R. Trifari

[57] ABSTRACT

A semiconductor arrangement for charging and discharging a capacitor. The discharge period is stabilized for variations in temperature and supply voltage by making the charge voltage equal to the discharge voltage applied across the leakage resistor. This is implemented by connecting the leakage resistor to the supply voltage through a plurality of stabilizing transistors, while the capacitor is charged from the supply voltage through switching transistors. The charge period is made much shorter than the discharge period and in one preferred embodiment all components except the leakage resistor and the capacitor are integrated in a semiconductor body. Two transistors in a common emitter configuration driving a third transistor are described to provide the capability for controlling the frequency and phase of the output signal of said arrangement.

9 Claims, 6 Drawing Figures

Figure 1:
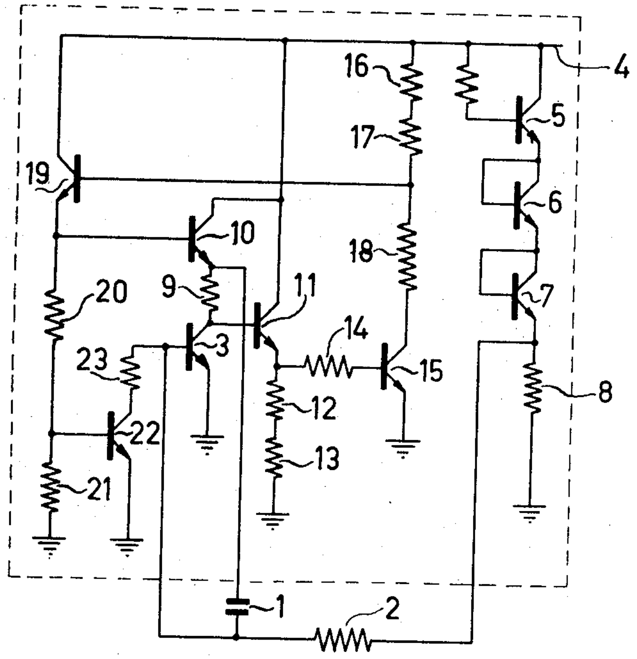

*INVENTORS*
PAULUS J.M. HOVENS
WOUTER SMEULERS
*BY*

AGENT

INVENTORS
PAULUS J.M. HOVENS
WOUTER SMEULERS
BY
AGENT

INVENTORS
PAULUS J.M. HOVENS
WOUTER SMEULERS
BY
Frank R. Trifari
AGENT

STABILIZED CAPACTIVE SAWTOOTH GENERATOR

The invention relates to an arrangement for charging and discharging a capacitor provided with a supply voltage having two terminals and formed with semiconductors operating as switches which, when being changed over, ensure the periodical charging and discharging of the capacitor, said change-over switches connecting the capacitor during the charge period mainly to terminals between which a charge voltage is present and during the discharge period through a leakage resistor to terminals between which a discharge voltage is present.

In so-called capacitive sawtooth generators a capacitor is charged by a direct voltage source through a resistor. Subsequently a further resistor is connected in parallel with the capacitor by means of a switch so that the charge stored in the capacitor flows away. In some uses, for example, in the television technique the duration of one of these two processes is much shorter (= the flyback) than that of the other (= the scan). A large number of generators is based on this principle. Such a generator is the so-called Miller integrator which is described, for example, in the book "Television" by F. Kerkhof en W. Werner, first edition pages 139–140. In this case the capacitor is arranged between the output and input terminals of an amplifier. As is known the linearity of the sawtooth voltage obtained is very satisfactory.

As a rule, transistors will be taken as an amplifier and as a switch. However, since transistors are temperature-dependent elements, unwanted variations may occur. Also the supply voltage may vary, for example, as a result of variations in temperature, fluctuations in the mains voltage or variations of loads connected to the same supply voltage. The result of all these variations is that the charge and/or discharge periods vary so that the frequency of the generated signal varies. It is true that the apparatus the generator forms part of often includes a frequency-control circuit, for example, a phase discriminator which ensures that this frequency is maintained constant, but it has been found that the said deviations may be so large, 600 Hz or more in the case of a line oscillator, that recontrolling of the frequency during the above described process becomes difficult. In addition, the part of the holding range of the control circuit which ensures recontrolling when the frequency varies for other reasons becomes smaller, while also the part of the pull-in range in which it is still possible to pull in becomes smaller. Such a situation occurs in a television receiver when switching over from one transmitter station to the other. Not only do all synchronizing pulses drop out temporarily, but it may occur that the line frequencies of both transmitters are not equal. If the said variations would be admitted the risk is not imaginary that the line oscillator cannot pull in at all.

It is an object of the invention to provide a stabilization of the generated signal and to this end it is characterized in that in order to stabilize the discharge period against variations in temperature and/or against variations of the supply voltage, both the terminals between which the charge voltage is present and the terminals between which the discharge voltage is present are connected to the terminals of the supply voltage through plurality of semi-conductors, part of which is associated with the change-over switches, and that the discharge voltage is equal to the charge voltage.

The arrangement according to the invention is particularly suitable to form part of an integrated circuit and the relevant semiconductor body is characterized in that all mentioned semiconductors and the resistors only denoted as a resistor are integrated in the semiconductor body.

Figure 2:
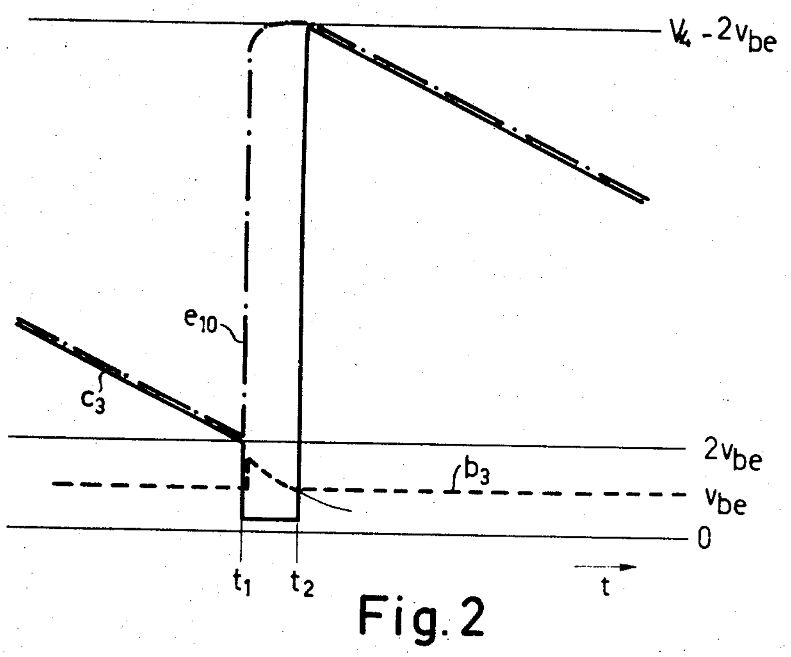
Figure 3:
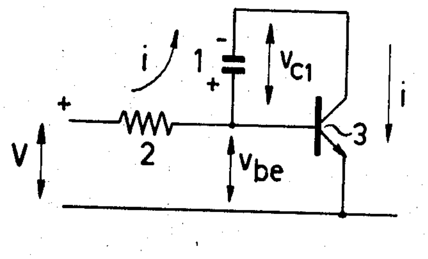
Figure 4:
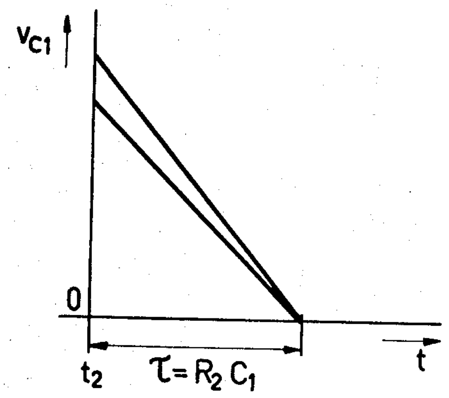
Figure 6:
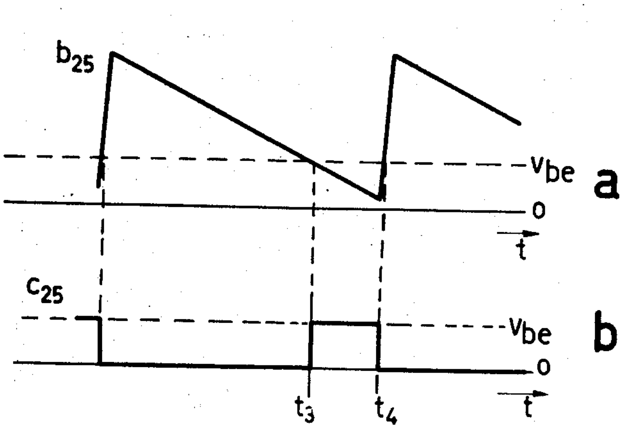
Figure 5:
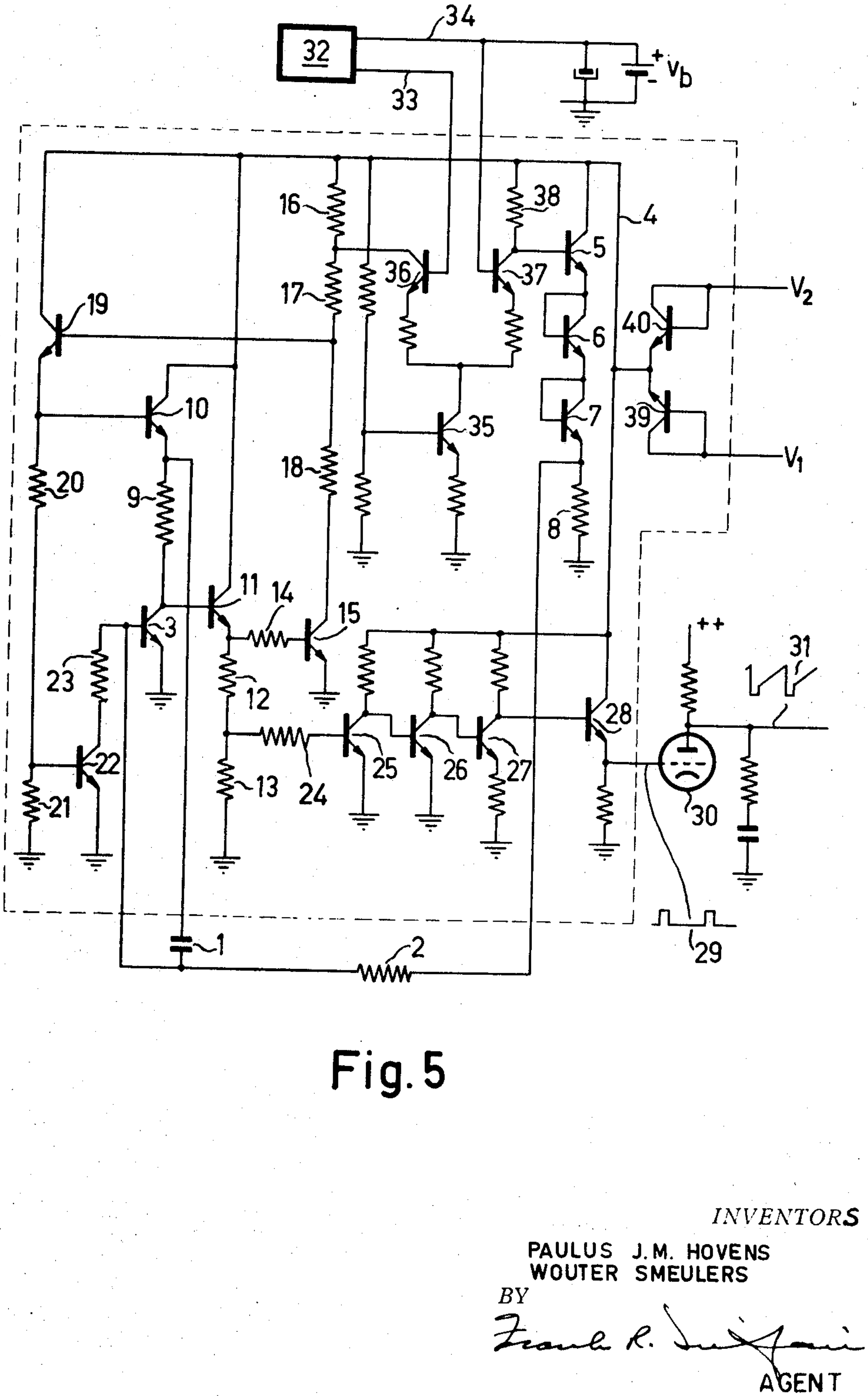

In order that the invention may be readily carried into effect, some embodiments thereof will now be described in detail, by way of example with reference to the accompanying diagrammatic drawings, in which:

FIGS. 1 and 5 show part of and the complete diagram, respectively, of a line frequency generator according to the invention, FIGS. 2 and 6 show a few voltage waveforms which occur in the circuit arrangements according to FIGS. 1 and 5, while FIG. 3 shows a non-detailed circuit diagram of part of the circuit arrangement of FIG. 1, and FIG. 4 shows the variation of a voltage occurring in FIG. 3.

In FIG. 1, the reference numeral 1 denotes the capacitor, 2 denotes the leakage resistor and 3 denotes the amplifier formed as a transistor which together constitute a Miller integrator. Leakage resistor 2 is connected to a direct voltage $V_4$ *via* three transistors 5, 6 and 7 and a conductor 4. As will be explained hereinafter, these transistors are substantially arranged as diodes so that the voltage at the free end of leakage resistor 2 is equal to the voltage $V_4$ reduced by three times the junction voltage $v_{be}$ of a transistor when it is assumed that the three transistors 5, 6 and 7 are identical. This assumption is justified if these transistors are integrated in one and the same semiconductor body. It will be evident that transistors 5, 6, 7 may be replaced by semiconductor diodes having the same junction voltage $v_{be}$. It they are silicon diodes, $v_{be}$ is approximately 0.8 V. The emitter of transistor 7 is connected to earth through a resistor 8 which has a much smaller value than leakage resistor 2, so that the emitter voltage of transistor 7, which is the voltage at the free end of leakage resistor 2, is substantially independent of the variations in the current flowing through leakage resistor 2. The junction of capacitor 1 and leakage resistor 2 is connected to the base of transistor 3 and the other junction of capacitor 1 is connected through a resistor 9 to the collector of transistor 3, the value of resistor 9 being much smaller than that of leakage resistor 2. In a practical embodiment of the circuit arrangement according to the invention in which the generated frequency is the line frequency, which is 15625 Hz in many countries, the values of resistors 2, 8 and 9 are approximately 56 k.ohms; 3.6 k.ohms and 1.3 k.ohms, respectively, while the capacitance of capacitor 1 is approximately 1.2 nF.

The emitter of transistor 3 is connected to earth. The junction of capacitor 1 and resistor 9 is connected to the emitter of a transistor 10 whose collector is connected to source $V_4$ and which does not conduct during the scan. If it is assumed that capacitor 1 at the commencement of the scan is fully charged, on the understanding that the junction of capacitor 1 and resistor 9 is positive relative to the other junction of capacitor 1, while transistor 3 is maintained conducting by a current flowing through leakage resistor 2 and originating from source $V_4$, then a current which discharges capacitor 1 flows through leakage resistor 2, capacitor 1, resistor 9 and transistor 3. This current is substantially determined by the voltage across leakage resistor 2, which is the difference between the emitter voltage of transistor 7 and the junction voltage $v_{be}$ of transistor 3 (this is approximately 0.8 V) and the value of leakage resistor 2 and therefore has a substantially constant intensity. The portion of the current flowing through leakage resistor 2 which begins to flow in the base of transistor 3 is negligibly small relative to the discharge current of capacitor 1, since this base current is always $\alpha'$ (= the current amplification factor of transistor 3) times smaller than the discharge current. Since this discharge current is substantially constant the collector voltage of transistor 3 decreases substantially linearly.

The collector voltage of transistor 3 drives the base of a transistor 11 whose emitter is connected to earth through two resistors 12 and 13, and which drives the base of a further transistor 15 via a resistor 14, the emitter of said transistor being connected to earth. The emitter voltage of transistor 11 follows its base voltage, however, at a difference which is equal to $v_{be}$. At the instant $t_1$ (see FIG. 2) when the collector voltage $c_3$ of transistor 3 becomes less than 2 $v_{be}$, that is to say, at the instant when the emitter voltage of transistor 11 becomes less than $v_{be}$ transistor 15 starts to conduct to a lesser extent. Its base current is decreased so that the voltage drop caused by this current across resistor 14 (= approximately 1.8 k.ohms in the above-mentioned embodiment) is then negligible.

The collector of transistor 15 is connected to source $V_4$ through three resistors 16, 17 and 18. At instant $t_1$ the collector voltage of transistor 15 increases. The base of a transistor 19 is connected to the junction of resistors 17 and 18, its collector is connected to source $V_4$ and its emitter is connected to earth through two resistors 20 and 21. Resistors 16, 17 and 18 have comparatively large values, approximately 3.5 k.ohms; 6.9 k.ohms and 3.8 k.ohms, respectively, so that transistor 15 is bottomed as long as its base voltage is higher than $v_{be}$ so that transistor 19 is then cut off. If transistor 15 is no longer bottomed, transistor 19 starts to conduct. Its emitter voltage was zero and now becomes positive. This voltage drives the base of transistor 10 which also starts to conduct so that its emitter voltage $e_{10}$ increases. The junction of resistors 20 and 21 drives the base of a further transistor 22 whose emitter is connected to earth and whose collector is connected through a resistor 23 to the base of transistor 3. When transistor 19 starts to conduct transistor 22 likewise conducts as soon as its base voltage tends to become higher than $v_{be}$.

The increase in the emitter voltage $e_{10}$ of transistor 10 is passed on through capacitor 1 to the base of transistor 3, so that this transistor will conduct to a greater extent and its collector voltage will further decrease. This effect is therefore cumulative. At instant $t_1$ transistor 15 is thus cut off very rapidly, and thus voltage steps are produced both at its collector and at the bases of transistors 19, 10 and 22. Transistor 22 is bottomed and its collector voltage becomes substantially zero. The base voltage of transistor 3 cannot therefore be maintained after instant $t_1$. In fact, if this voltage were to remain equal to 0.8 V, the collector current of transistor 22, with a value of approximately 2.6 k.ohms for resistor 23 in the said embodiment, would be approximately 0.8 : 2.6 = 0.31 mA. Voltage $V_4$ is approximately 7 V so that the current flowing through leakage resistor 2 would be approximately 7 − 4.08/56= 0.07 mA. Since this value is smaller than the first calculated value, the voltage of the base of transistor 3 cannot remain equal to 0.8 V, but becomes less as soon as the charge carriers have flowed away from its base layer. The current flowing through transistor 10, capacitor 1, resistor 23 and transistor 22 charges capacitor 1 at a time constant which is determined by capacitor 1 and the resistances which are "seen" in the emitter of transistor 10 and in the base of transistor 3, which constant is thus very short.

If the described process could be continued, the base voltage $b_3$ of transistor 3 would still more decrease, for it would assume the value which is determined by the emitter voltage of transistor 7 and resistors 2 and 23, which value is approximately 2.6, (7−3.08)/56 = 2.6 = 0.2 V. However, at an instant $t_2$ (see FIG. 2) the base voltage of transistor 3 becomes less than $v_{be}$ so that transistor 3 tends to be cut off. The instant $t_2$ is the instant when the sum of the currents flowing through leakage resistor 2, that is to say the collector current of transistor 22 and the base current of transistor 3 becomes less than 0.31 mA and therefore it is determined by the choice of the ratio of the value between resistor 23 and that of leakage resistor 2. The collector voltage $c_3$ of transistor 3 then increases to the voltage which is present at the emitter of transistor 10 which is the voltage $V_4$ reduced by twice $v_{be}$ which is the voltage of transistors 19 and 10 when it is assumed that the voltage drop caused by the base current of transistor 19 across resistors 16 and 17 is small. As a result of the increase of voltage $c_3$ from instant $t_2$ transistors 11 and 15 start to conduct as soon as the voltage $c_3$ becomes higher than 2 $v_{be}$ so that the base voltages of transistors 19, 22 and 10 decrease and so that in a corresponding manner the base current of transistor 5 tends to decrease still further and the effect of the increase of voltage $c_3$ is cumulative. Consequently, transistors 19, 10 and 22 are cut off substantially at instant $t_2$. The reversal at instant $t_2$ is so rapid that the base voltage $b_3$ of transistor 3 cannot actually become noticeably less than $v_{be}$. After instant $t_2$ source $V_4$ continues to apply a base current to transistor 3 through transistors 5, 6 and 7 and leakage resistor 2, so that this transistor is maintained in its conducting state and capacitor 1 is discharged through resistor 9 and transistor 3. This is the original situation.

It is to be noted that the circuit arrangement can operate satisfactorily only on the condition that leakage resistor 2 does not have too low a value, that is to say, the collector current of transistor 22 must be higher than the current flowing through leakage resistor 2, because otherwise transistor 3 would remain bottomed after instant $t_1$. Resistor 14 (approximately 1.8 k.ohms) has for its object to reduce the load of transistor 11 when transistor 15 is bottomed. Resistor 9 is a separation between the collector of transistor 3 and the emitter of transistor 10.

FIG. 2 shows some voltage waveforms, to wit voltages $c_3$, $e_{10}$ and $b_3$. Voltage $e_{10}$ is substantially equal to voltage $c_3$ except between the instants $t_1$ and $t_2$: at instant $t_1$ voltage $e_{10}$ is the voltage at earth increased by twice $v_{be}$ which are those of transistors 11 and 15. Between instants $t_1$ and $t_2$ voltage $e_{10}$ assumes the value $V_4$ decreased by twice $v_{be}$ which are those of transistors 19 and 10. The peak-to-peak amplitude of voltage $e_{10}$ is therefore voltage $V_4$ decreased by four times $v_{be}$ which is in this embodiment approximately 7–4,0.8 = 2.8 V. One connection of capacitor 1, that is to say, the connection to the base of transistor 3, has a substantially constant potential, namely $v_{be}$. The charge voltage of capacitor 1 is therefore substantially equal to the variation of the voltage $e_{10}$, that is to say, $V_4-4v_{be}$. Since the voltage at the emitter of transistor 7 is equal to voltage $V_4$ decreased by three times $v_{be}$, the direct voltage prevailing during the discharge period across the leakage resistor 2 is $V_4-4v_{be}$ and is consequently equal to the charge voltage of capacitor 1. If voltage $V_4$ and the junction voltages $v_{be}$ are constant and if the junction voltages $v_{be}$ are mutually equal this charge voltage is constant. Since the flyback period $(t_1, t_2)$ is determined by the ratio of the values of resistors 23 and 2 and the capacitance of capacitor 1, while the scan period (= discharge period) is determined by the value of leakage resistor 2 and the same capacitance as well as by the junction voltages $v_{be}$, these periods are constant as well. If follows that the frequency of the sawtooth voltage generated during the discharge period is likewise constant.

The requirement that all junction voltage $v_{be}$ occurring in the described circuit arrangement must be mutually equal may be satisfied if all transistors are integrated in one and the same semiconductor body. In fact, they all have substantially the same temperature. However, both supply voltage $V_4$ and the junction voltages $v_{be}$ may vary as a result of variations in temperature. In addition, as already noticed hereinbefore, voltage $V_4$ may also vary. The amplitude of the sawtooth voltage considered is therefore not constant. However, the invention is based on the recognition of the fact that the frequency of the said voltage remains constant despite its amplitude variations.

This is evident as follows. Since transistors 22 and 10 are cut off during the discharge period, the circuit diagram may be simplified to that according to FIG. 3, in which resistor 9 is left out of consideration relative to resistor 2. Voltage $V = V_4 - 3\ v_{be}$ is active between the free end of leakage resistor 2 and earth. During the entire discharge period transistor 3 conducts, so that it may be assumed that its base-emitter voltage remains constant, namely equal to $v_{be}$. If the base current of transistor 3 is left out of consideration relative to its collector current, which is permitted because the current amplification factor $\alpha'$ of the transistor is very high, then it may be assumed that the same current i flows through leakage resistor 2, capacitor 1 and transistor 3. Since $v_{be}$ is assumed to be constant, current i is constant, namely equal to $$V-v_{be}/R_2=V_4-4\ v_{be}/R_2,$$

wherein $R_2$ represents the value for leakage resistor 2. Current $i$ is also the discharge current of capacitor 1 so that the voltage variation $v_c$ thereacross is given by the following equation:

$$\frac{V_4-4v_{be}}{R_2}=-C_1\frac{dv_{c1}}{dt}$$

wherein $C_1$ is the capacitance of capacitor 1, and which gives the solution $$v_{c1}=-\frac{V_4-4v_{be}}{R_2C_1}t+K.$$

$K$ is the value which is assumed for $v_{c1}$ at the commencement $t_2$ of the discharge period, which is the charge voltage of capacitor 1. It follows that:

$$v_{c1}=-\frac{V_4-4v_{be}}{R_2C_1}t+V_4-4v_{be}.$$

This is a decreasing sawtooth function which is the voltage variation $v_{c1}$ becoming zero after an interval $\tau$ after instant $t_2$:

$$\tau=R_2C_1.$$

It is found that the expression for $\tau$ is independent of both voltage $V_4$ and of voltage $v_{be}$. FIG. 4 shows voltage variations $v_c$ across capacitor 1 for two different initial values of this voltage.

However, it is necessary that capacitance $C_1$ and resistance $R_2$ remain substantially independent of the temperature. For this reason, capacitor 1 and leakage resistor 2 are not integrated in the semiconductor body in which the other components of the described circuit arrangement are present. In order that the frequency of the generated signal remains satisfactorily constant it must be ensured that the flyback period $(t_1, t_2)$ does not vary. For this purpose a very short flyback period has been chosen namely in the order of 2 percent of the overall period. If temperature varies by 30° C so that the value of resistor 23 varies by 0.25°/° C the flyback period varies by 0.25 × 30 = 7.5 percent which is 7.5 × 0.02 = 0.15 percent of the overall period, which percentage is negligible. Thus a very stable oscillator is obtained with the described circuit arrangement and a single RC network.

Since the generated signal which is available, for example, at the emitter of transistor 11 has such a short flyback period it is not as such usuable to be applied to an output stage. In addition this output stage operates as a switch so that the drive voltage applied thereto must have steep edges. FIG. 5 shows the entire circuit arrangement. The output voltage of the oscillator drives a converter comprising transistors 25, 26 and 27 through a resistor 24 from the junction of resistors 12 and 13. Transistor 25 is bottomed except between the instants $t_3$ and $t_4$ (FIG. *6a* in which its base voltage $b_{25}$ is shown) so that the pulsatory voltage $c_{25}$ is produced at its collector according to FIG. *6b*. Resistor 24 reduces the load on transistor 11, while the ratio between the values of resistors 12 and 13 (in this case approximately 2 kohms and 2.3 k.ohms, respectively) determines the cut off period $(t_3, t_4)$ of transistor 25 which is approximately 20 percent of the period. Transistors 26 and 27 ensure steeper edges. Subsequently, the obtained pulsatory voltage 29 reaches through an emitter follower 28 the grid of a valve 30 whose anode voltage 31 is the drive voltage of an output valve. Likewise as valve 30, this valve may alternatively be a different switching element such as a transistor.

The circuit arrangement according to the invention has been described so far under the nominal conditions, that is to say, in the synchronizing condition. When the oscillator has not yet reached this condition, it must be possible to control the frequency or the phase of the generated voltage. This may be achieved by adding a positive or negative amount relative to the nominal value to the supply voltage of leakage resistor 2. Because this supply voltage originates from the emitter of a transistor such a variation is, however, difficult. The circuit arrangement, for example, a phase discriminator which must bring about this correction, would have to supply a very large current. The object of the circuit arrangement described hereinafter is to obviate this drawback.

In FIG. 5 the reference numeral 32 denotes a phase discriminator of known type between two output terminals 33 and 34 of which a positive or negative voltage is generated as a function of the frequency or phase difference between the incoming synchronizing pulses and the output signal 29. In addition a constant positive voltage $V_b$ of, for example, 3V is present at terminal 34. The semiconductor body, in which components 3 to 28 inclusive are integrated also includes a so-called long-tailed pair arrangement which consists of the transistor 35 operating as a current source and the two emitter-coupled transistors 36 and 37. The base of transistor 36 is connected to terminal 33 and its collector is connected to the junction of resistors 16 and 17, while the base of transistor 37 is connected to terminal 34. The base and the collector of transistors 6 and 7 are connected together so that the voltage across these transistors is equal to $v_{be}$ as previously stated.

The invention is based on the recognition of the fact that transistor 5 is so arranged that the base-emitter voltage thereof is equal to $v_{be}$ under nominal conditions while the base of the same transistor may be used for the frequency and phase control. For this purpose a resistor 38, which is identical to resistor 16 (3.5kohms), between the base of transistor 5 and conductor 4 and the collector of transistor 37 is connected to the same base. Under nominal conditions, that is to say, when the voltage difference between terminals 33 and 34 is zero, equal currents flow through resistors 16 and 38 and consequently the voltage across resistor 16 is equal to that across resistor 38. These voltages are temperature dependent, but are always equal so that the circuit arrangement is always in balance and the frequency remains unchanged. A small error is, however, caused by the fact that a current also flows through resistor 17 which is the base current of transistor 19 during the interval ($t_1$, $t_2$) but this error is compensated as much as possible by choosing a higher value for the sum of resistors 20 and 21 than for resistor 8.

During control the bases of transistors 36 and 37 receive unequal voltages. Because the sum of the collector currents of transistors 36 and 37 is constant, the collector voltage of one of these transistors decreases as much as the collector voltage of the other transistor increases. As a result the emitter current of transistor 5 and consequently the supply voltage of leakage resistor 2 vary. When phase discriminator 32 provides, for example, a negative voltage, that is to say, when the voltage at terminal 33 becomes less than the voltage $V_b$ present at terminal 34 a collector current flows through transistor 37 which is larger than the current flowing through transistor 36 so that the emitter current of transistor 5 is decreased. The leakage resistor 2 is fed by a lower voltage while the collector voltage of transistor 36 increases so that voltage $e_{10}$ (see FIG. 2) becomes higher between instants $t_1$ and $t_2$ than under the nominal conditions. This results in the discharge period $\tau$ of capacitor 1 becoming longer than under the nominal conditions, or in other words the frequency of the signal supplied is decreased. In fact, the above described equation now is:

$$\frac{V_4-4v_{be}-\Delta V}{R_2}=-C_1\frac{dv_{c1}}{dt}$$

while K becomes $V_4-4\,v_{be}+\Delta V$ so that voltage variation $v_{c1}$ becomes zero after a period $\tau'$:

$$\tau'=\frac{V_4-4v_{be}+\Delta V}{V_4-4v_{be}-\Delta V}\cdot R_2C_1=\left[1+\frac{2\Delta V}{V_4-4v_{be}-\Delta V}\right]\tau>\tau$$

This factor 2 is due to the fact that the sensitivity of a long-tailed pair arrangement is twice as great as that of a single fold amplifier.

Two equal negative feedback resistors are included in the emitter leads of transistors 36 and 37 in order to reduce the sensitivity of the control to some extent. For a value of approximately 4.6 k.ohms of these resistors the sensitivity is approximately 2 kHz/V, hence rather large. If it were still larger, the loop amplification might become critical.

It is true that the voltage prevailing across leakage resistor 2 assumes a value different from $V_4-4v_{be}$ during frequency control so that the above condition for temperature stabilization is no longer satisfied. The relative variation of this voltage during the pulling-in process, is, however, so small that the said process is not noticeably jeopardized, for a variation of 300 Hz corresponds to 2 percent of the nominal frequency.

An advantage of the described frequency control is that the frequency of the generated signal is nominal when the phase discriminator does not provide a voltage so that the entire discriminator may then be considered to be absent. The stabilization against variations in temperature and/or the supply voltage is thus not disturbed by the presence of the control circuit 32 to 37 inclusive. On the other hand a reactance circuit always behaves as a reactive impedance which is also connected under nominal conditions and has the drawback that it is temperature dependent because such an arrangement is generally formed by means of a transistor or a voltage-dependent capacitor. A further advantage of the relevant frequency control is that the voltage provided by phase discriminator 32 may be low, for it is simplified by transistors 36 and 37.

Since the line output stage is generally stabilized, supply voltages are frequently derived therefrom. In this respect this cannot be used without difficulty because the circuit arrangement according to the invention provides the drive voltage for the line output stage. The object of the transistors 39 and 40 arranged as diodes, whose emitters are coupled together (FIG.

5) is to build up the supply voltage required for the described circuit arrangement. The junction of the emitters of transistors 39 and 40 is connected to conductor 4 which operates as a supply voltage source for the circuit arrangement described. Transistor 39 receives a voltage $V_1$ originating from the mains and obtained by rectification, which voltage need not be satisfactorily smoothed, while transistor 40 is connected to a terminal in the line deflection circuit in which a constant direct voltage $V_2$ is produced during normal operation. Voltage $V_2$ is higher than voltage $V_1$, for example, approximately 12 V and 8 V, respectively. When switching on the apparatus voltage $V_1$ is first produced so that transistor 39 conducts and the line oscillator is activated. After short period voltage $V_2$ is generated so that transistor 40 starts to conduct while transistor 39 is cut off thereby. Supply voltage $V_4$ thus acquires its definitive value and is constant and free from heem.

In FIG. 5 the components which are integrated in the semiconductor body are shown within the part of the Figure denoted by broken lines.

It will be evident that the field of application of the circuit arrangement according to the invention need not be limited to the line time base of a television receiver, but is suitable for any arrangement in which a sawtooth signal of constant frequency is required.

What is claimed is:

1. A circuit arrangement for charging and discharging a capacitor to produce signals, comprising a current leakage resistor connected to said capacitor, a plurality of semiconductor circuits forming separate paths to said capacitor and leakage resistor, first and second terminals of a power supply coupled in parallel to said semiconductor circuits said plurality of semiconductors operating as switches by periodically connecting said capacitor during a charge period to a charging voltage and during a discharge period through said leakage resistor to a discharge voltage and stabilizing the frequency of said charging and discharging paths against variations in temperature and voltage supply, the discharging voltage of said capacitor being equalized to the charge voltage thereof as determined by the equal base to emitter voltage characteristics of the semiconductors of said respective paths.

2. A circuit arrangement as claimed in claim 1 wherein said capacitor is charged and discharged at frequencies compatible with the line frequencies of picture display apparatus.

3. A circuit arrangement as claimed in claim 1 wherein said charging and discharging circuits and stabilizing means are integrated in a semiconductor body.

4. A circuit arrangement as claimed in claim 1 wherein said plurality of semiconductor circuits forming a separate path to said capacitor for charging comprises a first transistor having its base connected to the junction of said capacitor and said leakage resistor, a first resistor having a lower resistance than that of said leakage resistor and having one terminal connected to the collector of said first transistor, a second transistor having its emitter connected to the other terminal of said first resistor and its collector connected to said first terminal of said power supply, the emitter of said first transistor being connected to said second terminal of said power supply.

5. A circuit arrangement as claimed in claim 4 wherein said plurality of semiconductor circuits forming a separate path to said capacitor and leakage resistor for discharging comprises, a third transistor having its emitter connected to the base of said first transistor through said leakage resistor, a plurality of transistors connecting the collector of said third transistor to said first terminal of said power supply, a second resistor of lower resistance than said leakage resistor interconnecting the emitter of said third transistor to said second terminal of said power supply, a fourth transistor arranged as an emitter follower, the collector of said first transistor driving the base of said fourth transistor, a fifth transistor having its emitter connected to the second terminal of said power supply, the emitter of said fourth transistor driving the base of said fifth transistor, a first plurality of resistors interconnecting the collector of said fifth transistor with the first terminal of said power supply, a sixth transistor arranged as an emitter follower, the junction of two of said first plurality of resistors driving the base of said sixth transistor, the emitter of said sixth transistor driving the base of said second transistor, a second plurality of resistors interconnecting the emitter of said sixth transistor with the second terminal of said power supply, a seventh transistor arranged as an emitter follower, the junction of two of said second plurality of resistors driving the base of said seventh transistor, a third resistor of lower resistor than said leakage resistor interconnecting the collector of said seventh transistor and the base of said first transistor.

6. A circuit arrangement as claimed in claim 5 wherein said first, second, fourth, fifth, and sixth transistors comprises means for switching and stabilizing, the seventh transistor comprise only means for switching, and the third transistor and the plurality of transistors connected to the collector of the third transistor comprises means for stabilizing.

7. A circuit arrangement as claimed in claim 5 wherein the resistance of the third resistor is ten times lower than the resistance of said leakage resistor.

8. A circuit arrangement as claimed in claim 5 further comprising means to control the discharging period, said means comprising frequency and phase control circuits, two emitter coupled transistors having common emitters connected to a constant current source and their bases coupled to said frequency and phase control circuits, a fourth resistor, the collector of one of the emitter coupled transistors being connected through said fourth resistor to the first terminal of said power supply, and to the base of one of the first plurality of transistors connected to the collector of the third transistor, and the collector of the other emitter-coupled transistor being connected to the junction of two of the collector resistors of the fifth transistor, a fifth resistor, the one of said two collector resistors connected between said junction and said first terminal of said power supply being said fifth resistor.

9. A circuit arrangement as claimed in claim 8 wherein the resistance of the fourth resistor is equal to the value of the fifth resistor.

* * * * *